UNITED STATES PATENT OFFICE.

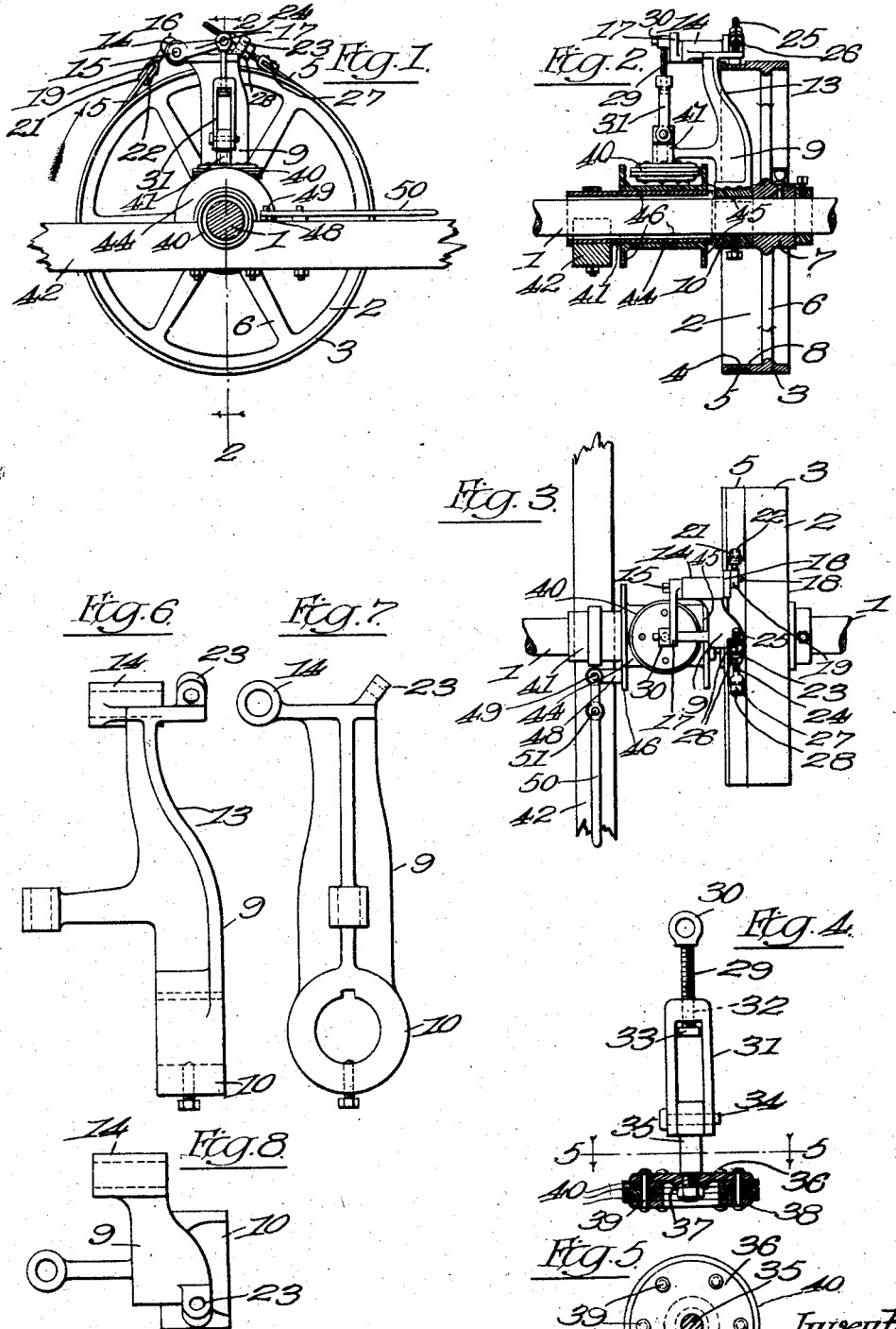

ANTONIO MONTENEGRO VAN-HALEN, OF MADRID, SPAIN.

POWER-TRANSMISSION COUPLING DEVICE.

No. 866,238.  Specification of Letters Patent.  Patented Sept. 17, 1907.

Application filed June 3, 1907. Serial No. 377,003.

*To all whom it may concern:*

Be it known that I, ANTONIO MONTENEGRO VAN-HALEN, a subject of the King of Spain, residing at Madrid, Spain, have invented certain new and useful Improvements in Power-Transmission Coupling Devices, of which the following is a specification.

This invention relates to improvements in coupling devices for the transmission of power from one element to another and has for its object the provision of a coupling device, preferably acting frictionally, and adapted to couple a body at rest with a movable body or uncouple the same very gradually in such a manner that no sudden impulses of movement will be transmitted during the coupling operation from the movable body or element to the body or element at rest.

The invention will be described in one of its embodiments in connection with the accompanying drawing and will be particularly pointed out and ascertained in and by the appended claims.

In the drawing, Figure 1 is a view in side elevation of a coupling device illustrating one embodiment of my invention. Fig. 2 is a sectional view on line 2—2 of Fig. 1. Fig. 3 is a plan view of the device illustrated in Figs. 1 and 2. Fig. 4 is a detail partly in section of an improved tension device. Fig. 5 is a sectional view on line 5—5 of Fig. 4. Figs. 6, 7 and 8 are side, face and top plan views respectively of a detail of my improved construction.

Like characters of reference designate similar parts throughout the different figures of the drawing.

The invention will now be described in detail with reference to one specific embodiment herein shown but it will be understood that the invention is not to be limited by the specific description and drawing except for such limitations as the claims import.

As shown 1 designates a power transmission shaft to which power may be applied from any convenient source and in any desired manner. A pulley 2 loosely mounted on said shaft is provided with a peripheral portion 3 about which a belt may be trained and is peripherally grooved or recessed at 4 to receive a clutch band 5. The spokes 6 and hub 7 are disposed at one side of the pulley preferably in alinement with the peripheral belt surface 3 thereby providing an overhanging portion 8. It will be understood of course that a pulley is not essential to a realization of the advantages of this invention and that this specific construction of pulley is set forth merely as a convenient form. A non-rotatably mounted carrying member preferably in the form of an arm 9 is provided with a hub 10 adapted to be keyed, as at 11 to the shaft 1, and is provided with a set bolt 12 to insure rigid fixture to the shaft 1. As shown said arm 9 is located in a manner to bring its hub 10 in close proximity to the hub 7 so that the main body portions of the arm are beneath and are overhung by the portion 8 of the pulley rim.

The arm 9 is laterally curved at 13 and is provided at its upper end with a bearing 14 disposed in parallel relation with the shaft 1. Means are carried by the arm and preferably located in the bearing 14 for operating the clutch band 5 and as shown said means consists in part of a band crank-shaft 15 provided at one end with an off-set portion 16 in the form of an extension eccentrically located with respect to the shaft and on its other end with a crank 17. Said extension 16 is provided with a stud 18 to which is secured a band connecting member 19 having a hub portion 20 and a jawed or clamped portion 21 in the latter part of which one end 22 of the band 5 is secured. A lug 23 mounted on the arm 9 carries a band connecting member 24 consisting of a threaded shank 25 adapted to project through said lug and be secured by nuts 26 and a jawed or clamped portion 27 to which the other end 28 of the band 5 is secured.

A threaded bolt 29 is secured by means of an eye 30 to the crank 17 and carries at its other end a link 31 provided with a threaded aperture 32 through which the bolt 29 projects. In order to prevent disengagement the bolt 29 is provided with a collar 33 adapted to engage the lower face of the upper end of said link when the parts approach the limit of adjustment in one direction. Said link 31 is preferably bifurcated and the lower ends of said bifurcated portions are pivotally connected by a pin 34 with the shank 35 of an actuating member which will now be described in detail. Said actuating member comprises in part as shown a base or supporting portion in the form of a disk 36 with which the shank 35 is connected at 37 by means of a threaded extension and nut. A ring 38 is connected with the disk 36 by means of rivets 39 and there is interposed between the disk and ring a plurality of layers of non-metallic material in the form of rings 40 which may be composed of leather or any suitable composition material having efficient friction or tractive qualities.

A support preferably in the form of a sleeve 41 desirably incloses a portion of the shaft 1 with a free intervening clearance and is rigidly secured to any suitable member such as 42 by a suitable clamp 43. The free end of the sleeve 41 carries a flanged collar 44 the flanges of which are designated by 45 and 46, said collar being non-rotatively and slidably mounted on said sleeve. The shank 35 projects through and is carried in an arm 47 extending from the arm 9. The collar 44 is provided with an extension or arm 48 to which is pivotally secured at 49 one end of an actuating lever 50 which is pivotally mounted between its ends at 51 to the support 42 or any convenient stationary part.

The operation is as follows. Assuming that the driving element 1 is rotating and that the driven element 3 is in a position of rest with the band 5 loosely engaging the annular recess 4 the operation of coupling the element 3 with its driving element 1 is effected in the following manner. The operator grasping the lever 50 will shift the collar 44 to bring one or other of the flanges 45 or 46 into engagement with the rings 40 and as the arm 9 is driven by the shaft such engagement will cause the rings 40 to rotate, rotative movement being communicated to the link 31 and serving by means of the threaded connection with the bolt 29 to operate the crank 17 in the direction of the arrow 52. This movement of the crank serves to rock the shaft 15 and causes the eccentrically mounted extension 16 to move in a clockwise direction and tighten the band 5. This operation serves to couple the pulley 3 with the shaft 1 by means of frictional engagement of the band 5 with the annular recess 4. The provision of the threaded connection between the crank 17 and the link 31 serves to very gradually tighten the band 5 upon the pulley in such a manner that no sudden jerks or motive impulses are imparted to the pulley and this feature performs the additional function of maintaining the crank 17 in a downward position and holding the band 5 in frictional engagement with the pulley. It will be understood that as soon as the band is thrown into clutch relation with the pulley the operator will return the collar 44 to an intermediate position such as is shown in Figs. 2 and 3 leaving a clearance between the rings 40 and the flanges 45 and 46. When it is desired to throw the driven member or pulley 3 out of clutch engagement with the driving member or shaft 1 the operator will grasp the lever 50 and throw one of the flanges 45 and 46 into engagement with the rings 40 so as to turn the link 31 in a direction opposite to which it was first turned so as to permit the crank 17 to raise and release the band 5, it being understood of course that the shifting movement of the collar 44 for clutching and unclutching will depend upon the manner in which the bolt 29 and link 31 are threaded that is whether or not said parts have a right or left hand thread. It will be further noted that the uncoupling operation is effected in a very gradual manner so that if the driven parts are under a considerable working load the injurious effects of sudden or abrupt stoppage will be entirely avoided.

It will be seen from the foregoing that the ends of the band are thrown into clutch relation with the pulley or other member by a tensioning means which serves to maintain the band in clutch relation, the rings 40 and collar 44 constituting broadly a tension actuating means adapted to normally occupy or be held in an inoperative or position of rest. The tension device and its actuating mechanism is thus associated with the coupling members and a driving and driven element.

It will be understood that while I have referred to shaft 1 as the driving member and to pulley 3 as a driven member that the invention is not to be limited to this particular arrangement as it will be obvious that pulley 3, or an equivalent element could be the driven member and act through the coupling device to drive shaft 1 and it will be further understood that the invention is not to be limited to the use of a pulley and a driving shaft since these terms are used and the specific disclosure is employed merely to illustrate one manner of carrying out the invention.

1. In combination, a driving shaft, a sleeve surrounding said shaft and provided with a non-rotatively and slidably mounted flanged collar, means for shifting said collar, a pulley loosely mounted on said shaft and provided with a band receiving recess, a coupling band for said recess, an arm rigidly mounted on said shaft, means connecting said arm with one end of said band, a crank shaft mounted in said arm and connected with the other end of said band, an actuating member carried by said arm and traveling freely between the flanges of said collar, and a threaded connection between said actuating member and said crank shaft.

2. In combination, a driving shaft, a sleeve surrounding said shaft and provided with a non-rotatively and slidably mounted flanged collar, a lever for shifting said collar, a pulley loosely mounted on said shaft and provided with a band receiving recess, a coupling band for said recess, an arm rigidly mounted on said shaft, means connecting said arm with one end of said band, a crank shaft mounted in said arm and connected with the other end of said band, a friction disk carried by said arm and adapted normally to freely travel between the flanges of said collar, and threaded members connecting said friction disk and crank shaft.

3. In combination, a driving shaft, a sleeve surrounding said shaft and provided with a slidably mounted flanged collar, means for shifting said collar, a pulley loosely mounted on said shaft, a coupling band for said pulley, an arm rigidly mounted on said shaft, a crank shaft mounted in said arm and operatively connected with said band, a friction disk carried by said arm and adapted normally to freely travel between the flanges of said collar, and threaded members connecting said friction disk and crank shaft.

4. In combination, a driving shaft, a slidably mounted flanged collar surrounding said shaft, a pulley loosely mounted on said shaft, a coupling member engaging said pulley, an arm rigidly mounted on said shaft, a crank shaft mounted in said arm and operatively connected with said coupling member, a friction disk carried by said arm and adapted normally to freely travel between the flanges of said collar, threaded members connecting said friction disk and crank shaft, and means for shifting said collar in opposite directions to operate said disk and throw the coupling member into or out of coupling relation with said pulley.

5. In combination, a driving shaft, a pulley loosely mounted on said shaft, a coupling member operatively associated with said pulley, an arm rigidly mounted on said shaft, means carried by said arm whereby said coupling member may be actuated, a friction disk carried by said arm, threaded connecting members operatively uniting said friction disk and said means, and mechanism for operating said friction disk.

6. In combination, a driving shaft, a driven member, a coupling member operatively associated with said driven member, an arm rigidly mounted on said shaft, means carried by said arm for controlling coupling member, a friction disk carried by said arm, threaded members connecting said friction disk and said means, a shiftable non-rotatable device normally out of engagement with said disk, and mechanism for throwing said device into engagement with said disk.

7. In combination, a driving member, a driven member, a coupling member operatively associated with said driven member, an arm rigidly mounted on said driving member, means carried by said arm for controlling said coupling member, a friction disk carried by said arm, threaded members connecting said friction disk and said means, and mechanism for rotating said disk in opposite directions.

8. In combination, a driving member, a driven member, a coupling member operatively associated with said driven member, an element rigidly mounted on said driving member, means carried by said element for controlling said coupling member, a friction disk carried by said element, threaded members connecting said disk and means, and mechanism for operating said disk.

9. In combination, a driving member, a driven member, a coupling member for operatively connecting said driving and driven members, an element rigidly mounted on said driving member, means carried by said element for controlling said coupling member, an actuating disk, a threaded connection for said disk and means, and mechanism normally out of operative relation with said disk for operating the same.

10. In combination, a driving member, a driven member, a coupling member for operatively connecting said driving and driven members, a threaded tension device for controlling said coupling member, and non-rotatable means for operating said device.

11. In combination, a driving member, a driven member, a coupling member for operatively connecting said driving and driven members, a threaded tension device for controlling said coupling member, a device for operating said tension device, and non-rotatable means normally out of operative relation with said operating device for operating the same in opposite directions.

In testimony whereof I affix my signature in presence of two witnesses.

ANTONIO MONTENEGRO VAN-HALEN.

Witnesses:
JOAQUIN GARRIDO Y PRIETO,
JOSÉ M. GAY.